Figure 4:
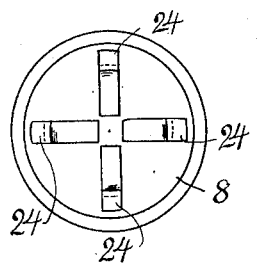

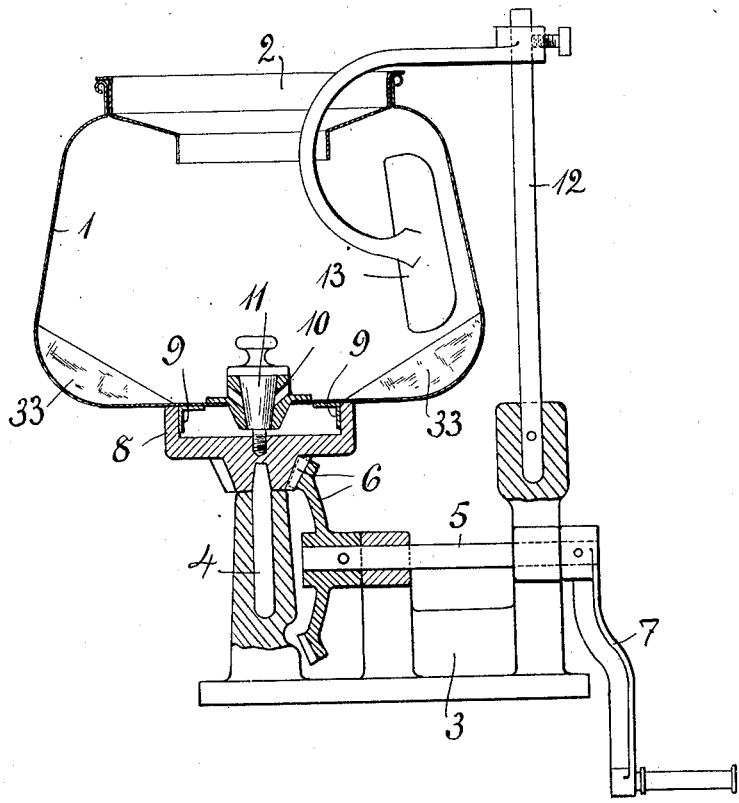

C. A. HULT & K. A. E. TINNBERG.
MILK RECEPTACLE FOR CENTRIFUGAL SEPARATORS.
APPLICATION FILED AUG. 21, 1913.

1,112,213.

Patented Sept. 29, 1914.
3 SHEETS—SHEET 2.

WITNESSES
Frank H. Logan
John H. Hoving

INVENTORS,
C. A. HULT and K. A. E. TINNBERG,
BY Berrigan
ATTORNEY.

C. A. HULT & K. A. E. TINNBERG.
MILK RECEPTACLE FOR CENTRIFUGAL SEPARATORS.
APPLICATION FILED AUG. 21, 1913.
1,112,213.
Patented Sept. 29, 1914.
3 SHEETS—SHEET 3.
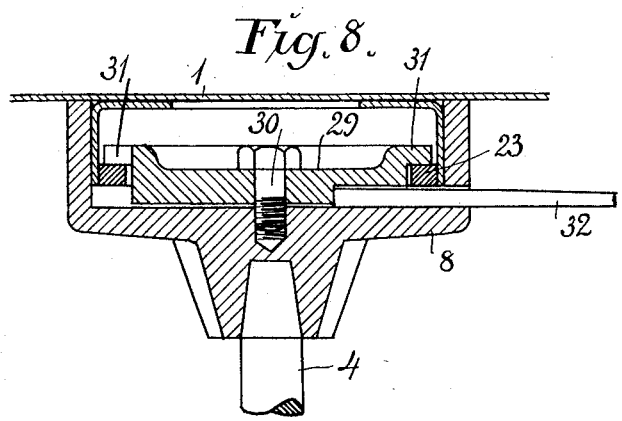
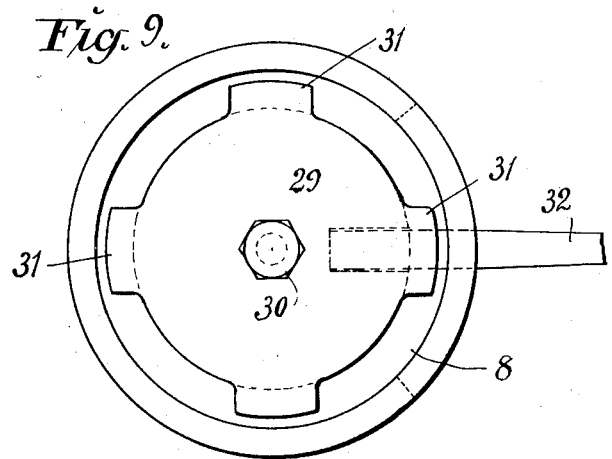
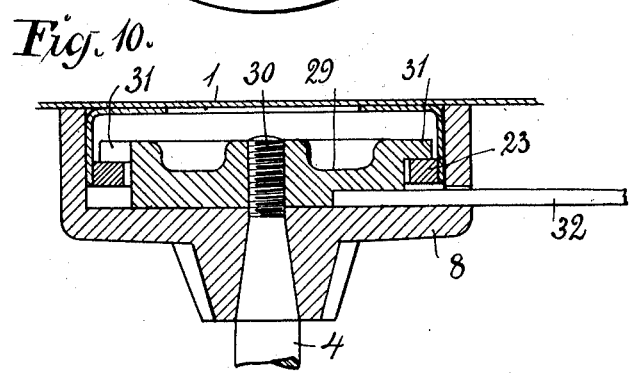
INVENTORS:
C. A. HULT AND K. A. E. TINNBERG,

UNITED STATES PATENT OFFICE.

CARL ALRIK HULT, OF STOCKHOLM, AND KNUT ARON EMANUEL TINNBERG, OF PARTILLE, SWEDEN.

MILK-RECEPTACLE FOR CENTRIFUGAL SEPARATORS.

1,112,213.      Specification of Letters Patent.      Patented Sept. 29, 1914.

Application filed August 21, 1913. Serial No. 785,923.

*To all whom it may concern:*

Be it known that we, CARL ALRIK HULT, a subject of the King of Sweden, and resident of Inedalsgatan 1, Stockholm, in the Kingdom of Sweden, and KNUT ARON EMANUEL TINNBERG, a subject of the King of Sweden, and resident of Partille, in the Kingdom of Sweden, have invented certain new and useful Improvements in Milk-Receptacles for Centrifugal Separators, of which the following is a specification, reference being had therein to the accompanying drawings.

This invention relates to a milk receptacle for centrifugal separators, which is so arranged, that it can be used as rotating or oscillating churn i. e. form the rotating or oscillating vessel of a churn. By means of a receptacle thus arranged the advantage is gained that one vessel can be used for the same purposes, for which hitherto two vessels always have been used, which vessels seldom are used simultaneously but involve double expense when bought, transported and so on. For the gaining of the said purpose the receptacle, in order to be used as a churn, is suitably contracted (or has a neck) at its top end for the retaining of the contents during the rotary motion of the receptacle, and is provided preferably at its bottom with a device, by means of which the receptacle can easily be connected with the driving mechanism of the churn and disengaged from the same. A ring shaped cover may be substituted for the said contracted shape which cover fits tightly to the top edge of the receptacle and prevents the cream from being thrown out during the churning operation. The said contracted shape and the said cover may, evidently, be used simultaneously.

The means, used for connecting the receptacle with the driving mechanism of the churn, may be constructed in different ways. For the said connection the ordinary opening provided in the bottom of the receptacle and shut by a cock or the like may, for instance, be used, in which opening, after the removing of the plug, a suitable part is located, which is brought into screw threaded engagement with the driving part or the shaft.

For the supporting of the receptacle and the centering of the same with relation to the driving shaft, which is vertical, a wide disk, a flange, a cross shaped part or the like provided at the top end of the shaft may be used, the bottom part of the receptacle being so shaped, that the receptacle can be placed on the said disk etc., as on a stand, and embraces the said disk, flange etc. to a greater or less extent or vice versa. Many other means may, however, be used for the said centering, for instance a sleeve and a pin or the like. The means connecting the receptacle with the shaft may, furthermore, be arranged like a so called bayonet-clutch, the desired easy connection and disengaging being thereby rendered possible. The said bayonet-clutch may consist of pins, ears or the like, provided on one of the parts (the bottom of the receptacle or the shaft) and of corresponding slots, angular projections or the like provided on the other part. By rotating the receptacle with relation to the shaft the former is easily connected with the latter or disengaged from the same. The clutch may be modified in many ways or other connecting means may be used, and the receptacle and the shaft may be connected either directly or indirectly by means of a part, which is rotatable by itself, so that the receptacle need not be rotated. In order to secure that the cream is rotated with the receptacle when used as a churn vessel, the receptacle is provided inside with wings or the like.

Figure 2:
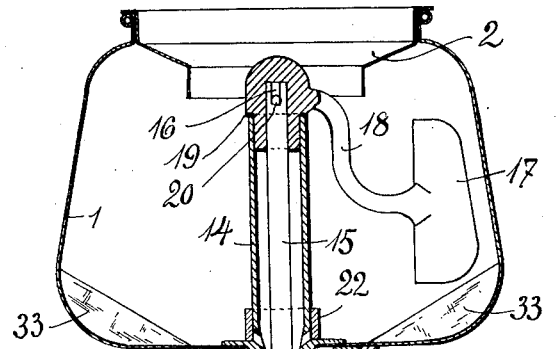
Figure 5:
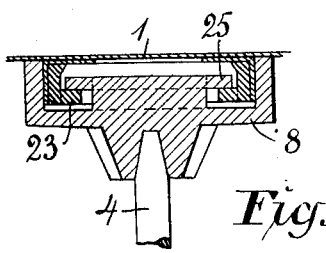
Figure 6:
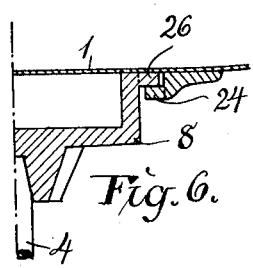
Figure 3:
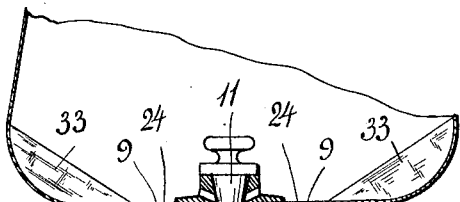
Figure 7:
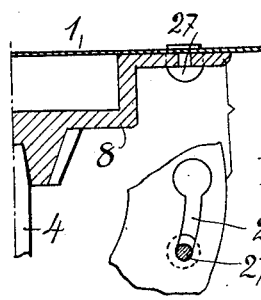

In the accompanying drawings Figure 1 shows in a vertical section the receptacle mounted on the driving shaft of a churn. Fig. 2 shows in a vertical section the receptacle and another device connecting the receptacle with the shaft of the churn. Figs. 3 and 4 show in a vertical section and in a plan view respectively the receptacle and the shaft of the churn connected directly by a bayonet-clutch. Figs. 5 to 7 inclusive show modifications of the said clutch. Figs. 8 and 9 show in a vertical section and in a plan view respectively a bayonet-clutch having a special rotatable part for the connecting of the receptacle and the shaft. Fig. 10 shows in a vertical section a modification of the clutch last mentioned.

As seen from the drawings, the receptacle has a shape suitable for its use as a rotating churn vessel, the side wall being bent outward and the top opening being large. A cover 2, Fig. 1, fits tightly in the said opening. Besides, the churn comprises the frame 3, the vertical shaft 4, on which the receptacle is mounted, the driving shaft 5, the gearing 6 and the crank 7, which parts may be arranged in the ordinary manner or as shown in the drawings, or in any other manner, if necessary. In order that the receptacle 1 may easily be mounted on the shaft 4, the latter is provided at its top end with a horizontal cup-shaped disk 8, having a vertical flange, and the receptacle is so shaped at its bottom, that it can be placed on the said disk. The receptacle is provided at its bottom with a flange 9, projections or the like, which fit to the said flange of the disk, inside or outside the same. Owing to the said arrangement the receptacle will have a fixed position on the shaft, co-axially to the same. The receptacle is provided at the center of the bottom with the ordinary cock for the admitting of the milk to the centrifugal apparatus, when the receptacle is used as a milk reservoir in the said apparatus. As the receptacle is to be used as a churn vessel, a tap 11 is mounted on the seat of the plug which is removed. The said tap 11 fits tightly to the said seat and is screw threaded, so that it can be brought into engagement with the top end of the shaft 4 or with the said disk 8, which is provided with a corresponding screw-threaded opening. By the said means the receptacle 1 is connected with the shaft and is compelled to partake in its rotary motion. The plug may also be so arranged, that it forms a screw, by means of which the receptacle is fixed to the shaft, in which case the screw is so adapted, that the cock is shut, when the screw has been tightened. The manner in which the receptacle is used in the centrifugal apparatus need not be particularly described. The receptacle is disengaged from the shaft and mounted in the ordinary manner on the so called regulator cup provided above the centrifugal apparatus, which cup is provided with the ordinary float controlling the quantity of the milk flowing downward into the centrifugal apparatus. To the frame 3 an upright 12 is fixed, to which the so called agitator 13 is fixed by means of an arm.

33 are the wings mentioned above, which wings are provided in the receptacle 1 and cause the cream to partake in the rotary motion of the receptacle, when it is used as a churn vessel. The said wings are preferably provided at the bottom of the vessel but may have any other suitable position. The number of the wings is arbitrary. Experience has proved that the wings need not be large for the purpose just mentioned and for that reason the wings form no obstacle worth mentioning in the receptacle when it is used in the centrifugal apparatus or while it is cleaned. The wings may be fixed in the receptacle in a detachable manner, if wanted.

In Fig. 2 the seat of the cock consists of a central tube 14 provided in the receptacle and extending upward. A shaft 15, fixed to the frame, extends through the said tube and for a distance above the top end of the tube. In the top end of the shaft 15 a groove 16 is provided. The arm 18 of the stationary agitator 17 is formed to or provided with a sleeve 19, which is slid on the shaft 15 and provided with a pin 20 which engages the said groove 16. The said sleeve fits in or on the tube and forms a bearing for the top end of the same. The gearing actuates the disk 8, which in this case rotates around the stationary shaft 15. The receptacle is held in its place on the disk by the gravity. In order that the receptacle may be positively actuated by the disk, it may be provided with a projection 21 or the like, which engages a recess provided in the disk 8. On the tube a ring or sleeve 22 is slid, closing the holes provided in the lower end of the tube, which holes should be open, as the receptacle is used in the centrifugal apparatus, in which case the ordinary plug is provided in the tube. As the receptacle is to be used in the centrifugal apparatus, it is taken off the shaft, the plug of the cock is located in the tube, the receptacle is mounted on the centrifugal apparatus, the milk filled in and the cock opened.

The shape of the receptacle and the manner in which the receptacle is applied to the driving mechanism of the churn may evidently be modified in many ways. For instance arms extending from the shaft may be substituted for the disk 8, which arms are provided with openings for corresponding pins provided in the bottom of the receptacle and so on. The cock, provided in the bottom of the receptacle, may be arranged in many other manners than shown in the drawings. Also in the form of the invention shown in Figs. 3 and 4 the receptacle 1 is carried by the cup shaped disk 8 provided on the top end of the driving shaft 4. The flange 9 of the receptacle has an inward extending rib 23 which is engaged by hooks 24 fixed to the flange of the disk 8. Notches are provided in the rib 23, through which the said hooks 24 pass, as the receptacle is being mounted on the disk 8. As the receptacle is then turned with relation to the shaft, the hooks 24 engage the top side of the rib 23 and positively connect the receptacle with the driving shaft. A suitable abutment (not shown) may be provided for limiting the said turning of the receptacle and a jam screw (not shown) or the like may be provided which when tightened prevents the receptacle from being turned in the opposite direction.

The parts of the top side of the rib 23, which are engaged by the hooks, may be somewhat inclined, in order that the receptacle may be forced against the supporting disk, as it is turned with relation to the shaft. The receptacle is turned in a direction opposite to the rotary direction of the receptacle, when operating as a churn vessel. By turning the receptacle in opposite direction the receptacle is easily brought out of engagement with the shaft. The agitator 13 mentioned above and the means carrying the same are not shown in Fig. 3. Instead of the said hooks a flange 25 may be provided in the cup shaped disk 8, in which flange notches are provided. The rib 23 has a corresponding shape and notches, as shown in Fig. 5, which figure is easily understood without further explanation. As shown in Fig. 6 the hooks 24 are fixed to the receptacle 1 and engage a flange 26, similar to the flange 23 and provided on the outer side of the cup shaped disk 8. As shown in Fig. 7 pins 27 with heads are located at the bottom of the receptacle and slots 28 of the shown shape provided in the flange of the disk for the said pins. Also in the receptacle shown in Fig. 3 the bottom cock 11 mentioned above is provided. Instead of a solid disk or cup 8 a cross shaped piece or the like provided on the shaft may be used.

In the form of the invention shown in Figs. 8 to 10 inclusive a disk 29 or the like is located on the bottom of the cup shaped disk, which disk 29 can be rotated around a pin 30, connecting the disk 29 with the shaft 4. The said disk 29, for which a cross shaped piece or the like may be substituted, is provided at its outer edge with hooks 31, which engage the flange 23, projections or the like, provided on the receptacle 1. The cup shaped disk has an opening for a handle 32, which is slid into a recess provided in the disk 29 and by means of which the disk 29 can be rotated. Consequently, the connecting of the receptacle with the shaft is effected in this form of the invention indirectly by rotating the disk 29. The clutch is, however, of the same type as that shown in Figs. 3 to 7 inclusive, viz. a bayonet-clutch. The receptacle may be forced against the cup shaped disk by the pin 30, which is in screw-threaded engagement with the disk and has a nut or head, being rotated together with the disk 29 and thus moved farther downward into the disk 30 (Fig. 8), as the disk 29 is rotated in one direction for the fastening of the receptacle. The pin is raised when rotated in the opposite direction. The same object may be gained by the disk 29 being in screw threaded engagement with the pin, which then is stationary, Fig. 10, or by slanting surfaces on the flange 23 or the like.

Having now described our invention, what we claim as new and desire to secure by Letters Patent is:

1. In combination, a disk shaped cup rotatable about a vertical axis; means for rotating and means for supporting said cup; a milk receptacle adapted for churns and centrifugal separators; and a downwardly projecting flange secured to the bottom of said receptacle and snugly received on said cup.

2. In combination, a disk shaped cup rotatable about a vertical axis; means for rotating and means for supporting said cup; a milk receptacle adapted for churns and centrifugal separators; a downwardly projecting flange secured to the bottom of said receptacle and snugly received on said cup; and means for holding said flange in the cup.

3. In combination, a disk shaped cup rotatable about a vertical axis; means for supporting and means for rotating said cup; a milk receptacle adapted for churns and centrifugal separators; a downwardly projecting flange secured to the bottom of said receptacle and snugly received on said cup; and means for holding said flange in the cup; and a bayonet connection for holding the flange in the cup.

4. In combination, a disk shaped cup rotatable about a vertical axis; means for rotating and means for supporting said cup; a milk receptacle adapted for churns and centrifugal separators; a downwardly projecting flange secured to the bottom of said receptacle and snugly received on said cup; an inwardly extending notched rib secured in said flange; and hooks secured in said cup and adapted to pass through the notches of the rib and to engage over the rib.

5. In combination, a disk shaped cup rotatable about a vertical axis; means for rotating and means for supporting said cup; a milk receptacle adapted for churns and centrifugal separators; a downwardly projecting flange secured to the bottom of said receptacle and snugly received on said cup; an inwardly extending rib in said cup and having inwardly opening notches; a disk rotatably secured in said cup and provided with hooks adapted to pass through said notches and engage over said rib.

6. In combination, a disk shaped cup rotatable about a vertical axis; means for rotating and means for supporting said cup; a milk receptacle adapted for churns and centrifugal separators; a downwardly projecting flange secured to the bottom of said receptacle and snugly received on said cup; a cock in the center of the bottom of the receptacle for use when the vessel is used as a separator; and closing means seated in said cock.

7. In combination, a vessel having an opening in the center of the bottom thereof; a closing means for said opening; a rotatable support engaging and holding said bottom of the vessel only at the points remote from said opening.

8. In combination, a disk shaped cup rotatable about a vertical axis; means for rotating and means for supporting said cup; a milk receptacle adapted for churns and centrifugal separators; a downwardly projecting flange secured to the bottom of said receptacle and snugly received on said cup; and a stationary agitator supported within said vessel.

In witness whereof, we have hereunto signed our names in the presence of two subscribing witnesses.

CARL ALRIK HULT.
KNUT ARON EMANUEL TINNBERG.

Witnesses to the signature of Carl Alrik Hult:
GUSTA PRINN,
ROBERT APELGREN.

Witnesses to the signature of Knut Aron Emanuel Tinnberg:
P. LILJA,
THORL. JACOBSON.

---

Copies of this patent may be obtained for five cents each, by addressing the "Commissioner of Patents, Washington, D. C."